(12) United States Patent
Suckling et al.

(10) Patent No.: US 8,482,302 B2
(45) Date of Patent: Jul. 9, 2013

(54) CLEARANCE DETERMINATION DEVICE

(75) Inventors: Martin S. Suckling, Derby (GB); Lee Mansfield, Derby (GB); Peter D. Webb, Derby (GB)

(73) Assignee: Rolls-Royce plc, London (GB)

( * ) Notice: Subject to any disclaimer, the term of this patent is extended or adjusted under 35 U.S.C. 154(b) by 382 days.

(21) Appl. No.: 12/385,826

(22) Filed: Apr. 21, 2009

(65) Prior Publication Data

US 2009/0289620 A1 Nov. 26, 2009

(30) Foreign Application Priority Data

May 21, 2008 (GB) .................................. 0809215.7

(51) Int. Cl.
*G01R 27/06* (2006.01)
(52) U.S. Cl.
USPC ............................ 324/662; 324/661; 324/644
(58) Field of Classification Search
USPC .................................................. 324/661, 644
See application file for complete search history.

(56) References Cited

U.S. PATENT DOCUMENTS

| | | | | |
|---|---|---|---|---|
| 3,054,279 A | * | 9/1962 | Crawford | 66/48 |
| 4,395,827 A | * | 8/1983 | Stowe et al. | 33/655 |
| 5,497,101 A | * | 3/1996 | Fillion | 324/662 |
| 5,818,242 A | * | 10/1998 | Grzybowski et al. | 324/642 |
| 6,731,115 B2 | * | 5/2004 | Saitoh | 324/424 |
| 6,833,793 B2 | * | 12/2004 | Dzieciol et al. | 340/686.3 |
| 6,879,404 B2 | * | 4/2005 | Jagiella et al. | 356/614 |
| 7,064,559 B2 | * | 6/2006 | Bissonnette et al. | 324/662 |
| 7,466,143 B2 | * | 12/2008 | Andarawis et al. | 324/644 |
| 7,808,233 B2 | * | 10/2010 | Jensen | 324/207.25 |
| 2004/0251916 A1 | * | 12/2004 | Kirzhner | 324/635 |
| 2005/0218887 A1 | | 10/2005 | Twerdochlib | |
| 2007/0063712 A1 | | 3/2007 | Crum et al. | |
| 2008/0303513 A1 | * | 12/2008 | Turner | 324/160 |
| 2010/0135800 A1 | * | 6/2010 | Melius | 416/44 |
| 2011/0285129 A1 | * | 11/2011 | Li et al. | 290/44 |

FOREIGN PATENT DOCUMENTS

DE 100 15 155 A1 10/2001
GB 2 112 080 A 7/1983

\* cited by examiner

*Primary Examiner* — Richard Isla Rodas
(74) *Attorney, Agent, or Firm* — Oliff & Berridge, PLC

(57) ABSTRACT

A device is provided for measuring the clearance between a member and a surface over and relative to which the member moves. The device has a first reference element, and a second reference element which faces the first reference element, and is movable to alter the distance to the first reference element. The device further has a fastening system for fastening the device to the member so that, during the relative motion, the first reference element is held in a fixed position relative to the member and the second reference element slides over the surface. The device further has an urging arrangement which urges the second reference element into contact with the surface so that, as the second reference element slides over the surface and the clearance between the member and the surface varies, the second reference element moves relative to the first reference element. The device further has a sensor which measures the distance between the first and second reference elements.

21 Claims, 4 Drawing Sheets

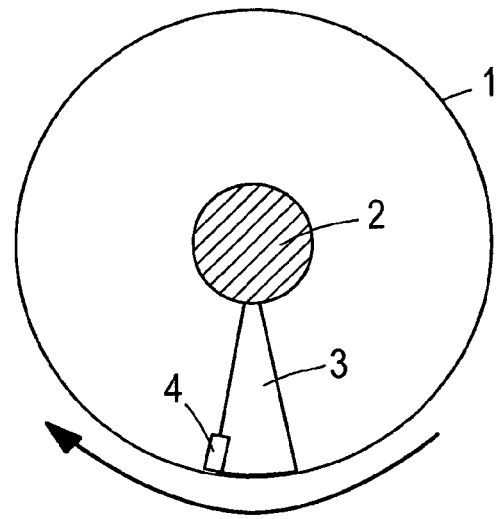
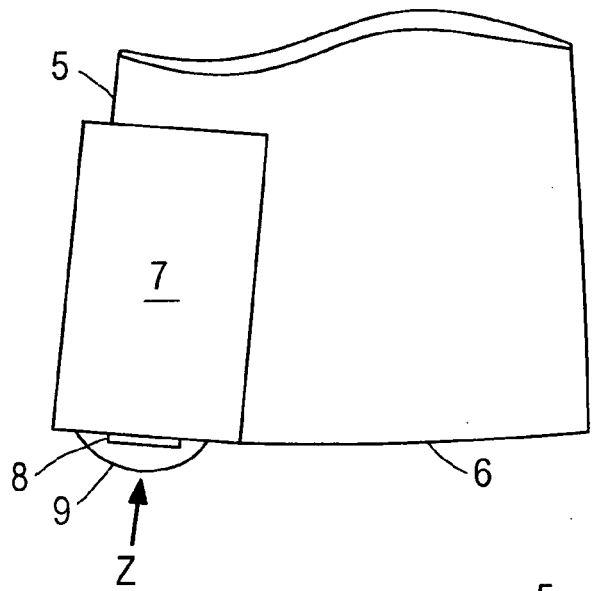
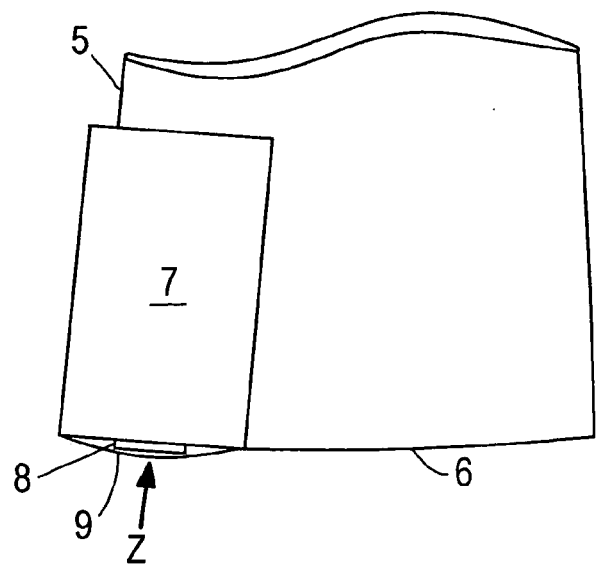

CLEARANCE DETERMINATION DEVICE

The present invention relates to a device for determining the clearance between a member and a surface over and relative to which the member moves. Particularly, but not exclusively, the device can be used for determining the clearance between a rotor blade tip and the engine casing of a gas turbine engine.

In a gas turbine engine, reducing the clearance between the tips of the rotor blades and the surrounding casing increases the efficiency that can be achieved with the engine. However, it is also desirable to prevent, as far as possible, the tips rubbing on the casing. Therefore, because the dimensions of the engine components, and particularly the lengths of the rotor blades, can alter with the operating condition of the engine, it is usual during engine build and maintenance to set a predetermined tip clearance for each rotor blade in the cold condition, which clearance will maintain a small clearance at most operating conditions and will also prevent rubbing.

Various tools are known for measuring the tip clearance of rotor blades. One example are Gapman™ sensor wands from Capacitec, Inc. These are hand-held devices which can be inserted into the gap between a rotor tip and the casing. The wand has facing capacitor plates which respectively contact the rotor tip and casing. The plates are biased so that, when inserted into the gap, they press outwardly against the rotor tip and casing to ensure contact is made with the rotor tip and casing. Varying the distance between the capacitor plates changes the capacitance of the wand, so the device can correlate a measured capacitance to the clearance between the rotor tip and the casing.

However, engine constraints can make it difficult to insert hand-held devices, such as Gapman™ sensor wands, between the rotor tip and the casing. Also, known hand-held devices may not be suited for measuring clearances between the two curved surfaces of a rotor tip and the surrounding casing.

Thus, in general terms, the present invention provides a device for determining the clearance between a member and a surface over and relative to which the member moves, wherein the device is fastenable to and remains with the member during the relative motion.

More particularly, a first aspect of the present invention provides a device for determining the clearance between a member and a surface over and relative to which the member moves, the device having:

a first reference element, a second reference element facing the first reference element, and being movable to alter the distance to the first reference element, a fastening system for fastening the device to the member so that, during the relative motion, the first reference element is held in a fixed position relative to the member and the second reference element slides over the surface, an urging arrangement which urges the second reference element into contact with the surface so that, as the second reference element slides over the surface and the clearance between the member and the surface varies, the second reference element moves relative to the first reference element, and a sensor which measures the distance between the first and second reference elements.

Thus, it is not necessary for an operator to insert and hold such a device while a clearance measurement is taken. Further, repeated insertions at different positions of the member can be avoided because the device remains with the member during the relative motion. Advantageously, the device can build up a continuous picture of the clearance along the surface. In contrast, hand-held devices only measure the clearance at spaced locations.

The surface can be, for example, a planar surface. However, preferably, the surface is a curved surface around and relative to which the member rotates.

Thus the curved surface may be the surface of a bore. For example, the curved surface may be the inner wall of a casing of a turbomachine, and the member may be a rotor blade of the turbomachine. Preferably, the curved surface is the inner wall of a casing of an aero gas turbine, the member being, for example, a fan blade.

However, the curved surface may be the outer surface of a body.

The curved surface may be a surface of a first shaft, and the member may be a coaxial, radially inner or outer, second shaft, the two shafts, in use, rotating relative to each other.

As well as allowing the clearance between the member and the surface to be determined, the distance between the first and second reference elements can also allow the smoothness of the surface to be determined. That is the device can be used as a surface smoothness determining device.

Preferably, the first and second reference elements comprise respective electrical capacitor plates and the sensor senses changes in the capacitance between the plates to measure the distance between the first and second reference elements. However, in other embodiments, one of the first and second reference elements may comprise an electrical inductor and the sensor senses changes to the lo magnetic coupling between the inductor and the other reference element to measure the distance between the first and second reference elements.

The first and second reference elements can be configured to allow small clearances, e.g. as low as about 0.6 or 0.5 mm, to be determined. For example, the thickness of reference elements comprising electrical capacitor plates, or the thickness of a reference element which is coupled to an electrical inductor can be less than 0.5 mm.

The device may further have an onboard battery system which powers the device. Thus the trailing wires of hand-held devices, such as Gapman™ sensor wands, which can make such devices inconvenient to use in engine build and maintenance environments, can be avoided.

The device may further have an onboard memory which stores the distances measured by the sensor. Thus again, trailing wires can be avoided. The device can also then operate as a stand-alone system which can be interrogated, for example, after use by downloading the stored data into a computer system.

However, preferably the device further has a wireless telemetry system which transmits the distances measured by the sensor to e.g. a computer system. This facilitates real time analysis of the distance measurements.

Preferably, when the surface is a curved surface around and relative to which the member rotates, the device further has an angular measurement system which measures the angle of rotation of the member. For example, the device may have two accelerometers mounted in quadrature to measure the angle of the member. The angular measurements can be matched with corresponding distance measurements, allowing the clearance at any angular position to be determined. When the device also has an onboard memory, the angular measurements may be stored therein. Likewise, when the device has a wireless telemetry system, the angular measurements may be transmitted over that system.

A second aspect of the present invention provides the use of the device of the first aspect for determining the clearance between a rotor or stator blade and a casing of a turbomachine (such as an aero gas turbine) around and relative to which the blade rotates.

Embodiments of the invention will now be described by way of example with reference to the accompanying drawings in which:

FIG. 1 is a schematic drawing of an aero gas turbine engine viewed end-on from the front;

FIG. 2 is a schematic drawing of a device according to the present invention, the skid of the device being at a position of maximum clearance;

FIG. 3 is a schematic drawing of a device according to the present invention, the skid of the device being at a position of minimum clearance;

Figure 4:
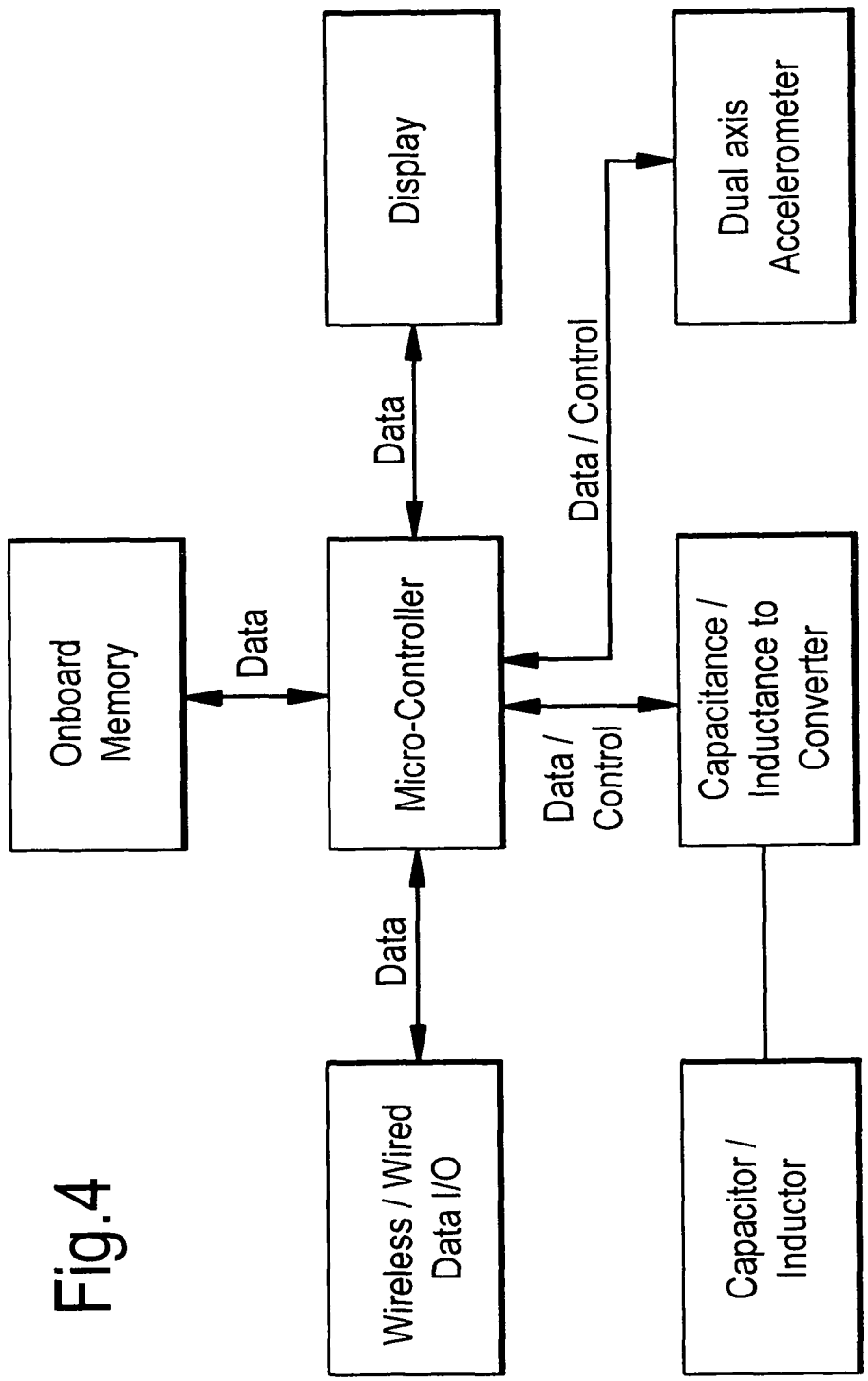
FIG. 4 is a schematic diagram for the sensor electronics of the device of FIGS. 1 to 3.
Figure 5A:
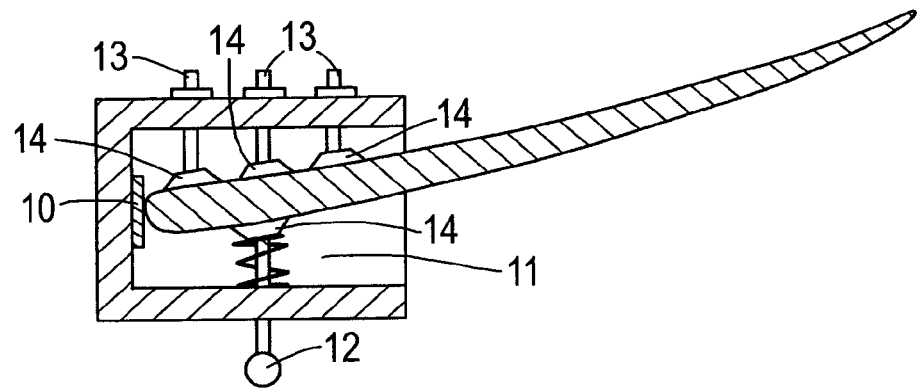
Figure 5B:
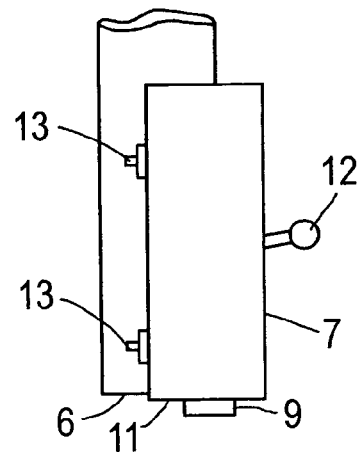
Figure 5C:
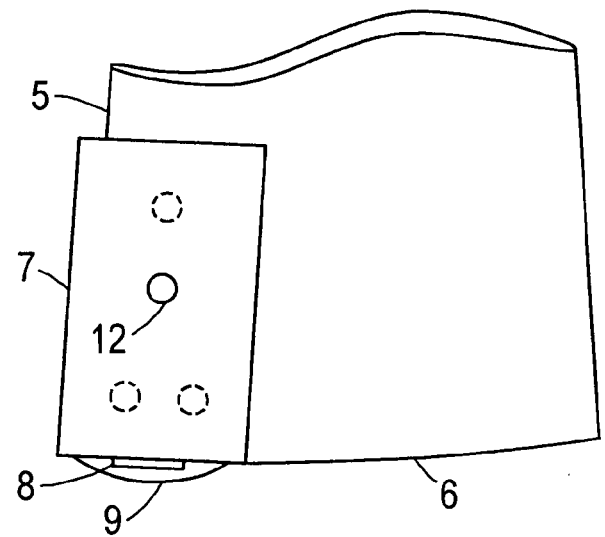
Figure 6A:
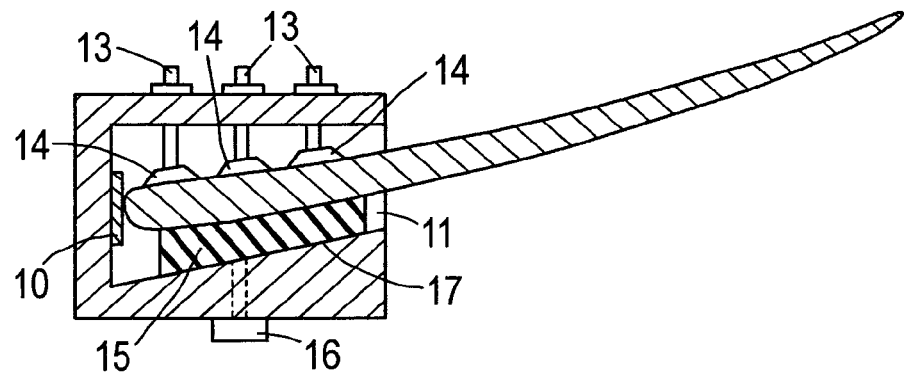
Figure 6B:
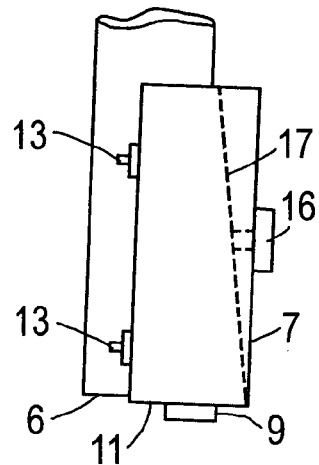
Figure 6C:
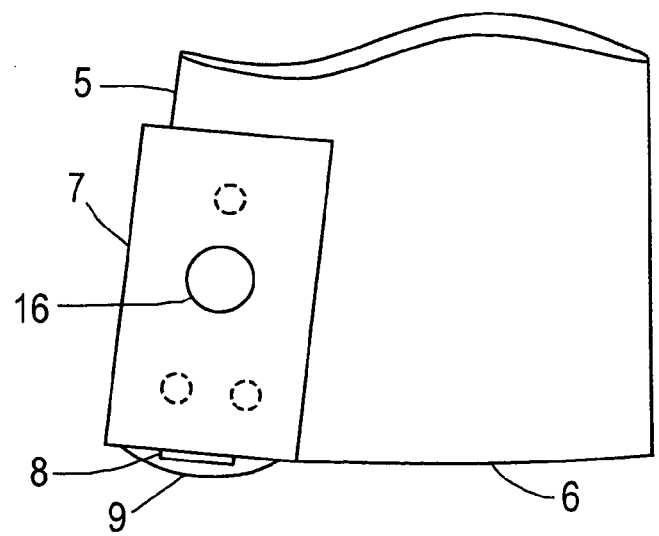

FIGS. 5a to c are respectively cross-sectional, front and side views of a device similar to that shown in FIGS. 1 to 4; and FIGS. 6a to c are respectively cross-sectional, front and side views of a variant of the device shown in FIG. 5.

FIG. 1 is a schematic drawing of an aero gas turbine engine viewed end-on from the front. The engine has a casing 1, a spinner 2 and a circular series of fan blades 3, of which only one is shown in the drawing. The direction of rotation of the fan blades is indicated by the arrow. As the fan blade rotates, the radially outer tip of the blade maintains a small clearance from the inner wall of the casing.

Mounted on the leading edge of the fan blade, adjacent to the casing, is a device or gauge 4 for determining that clearance. Alternatively, the device could be mounted on the trailing edge of the blade. Indeed, two devices could be mounted, one on the leading edge and one on the trailing edge, which would allow variation in the gap between the tip of the blade and the wall of the casing to be assessed along the chord of the blade. FIG. 2 is a schematic close-up drawing of the device.

The radially outer end of the device carries a pad 8 comprising a capacitor plate and facing skid 9 carrying another capacitor plate. Suitable capacitor plates are known to the skilled person. The pad and the skid fit in the small radial gap that exists between the wall of the casing and the tip 6 of the fan blade. The body 7 of the device is fixed to the leading edge 5 of the blade by a fastening system (not shown in FIGS. 1 to 3) so that the pad 8 just clears the tip 6. The skid is formed from a resilient material which flattens when pressed, but returns to its original shape when relieved of pressure. This arrangement urges the skid against the wall as the clearance between the wall and the blade tip changes. However, in an alternative arrangement, a separate element, such as a spring, could urge the skid against the wall.

A suitable resilient material for the skid is beryllium copper alloy which advantageously is electrically conductive, thereby facilitating electrical connection to the capacitor plate carried by the skid.

When the blade rotates, the device rotates with the blade, the pad 8 is held in a fixed position relative to the blade, and the skid 9 slides over the wall of the casing. As shown in FIG. 2, the skid is at a position of maximum clearance between the wall and the tip. However, when the clearance reduces, the skid deforms and the distance in the Z direction between the pad and the skid reduces, as shown in FIG. 3.

The change in capacitance between the respective capacitor plates of pad 8 and the skid 9 as the distance between them changes is detected by a sensor (not shown) comprising suitable electronics, known to the skilled person and integral with the device. The sensor electronics also have calibration functionality to convert the change in capacitance to a distance measurement, being the clearance between the blade tip and the wall. For example, in the sensor, signals relating to the capacitance may first be passed to an analogue to digital converter, and the digitised signals then sent to a microcontroller which converts the digitised signals into suitably calibrated distance measurements. The measurements can then be shown on an integral display screen. FIG. 4 is a schematic diagram for the sensor electronics.

As an alternative to the capacitor plates, pad 8 could carry an electrical inductor (indicated on FIG. 4) the properties of which are influenced by the permeability and proximity of skid 9. The change in inductance as the distance between the pad and the skid varies would then be detected by the sensor.

The fastening system which fixes the body 7 of the device to the leading or trailing edge of the blade may be a simple strap wrapped chord-wise round the blade. However, FIGS. 5a to c, which are respectively cross-sectional, front and side views of a device similar to that of FIGS. 1 to 4, show details of a more sophisticated fastening system.

The body 7 of the device has a front location plate 10 for accurately locating the device on the leading edge of the blade, and a base location plate 11 for accurately locating the device on the tip 6 of the blade. Accurate positioning of the device relative to the face of the blade is achieved by three adjustment screws 13 provided on one side of the device. Each adjustment screw is fitted with a floating head 14 so that the face of the head lies flat on the blade face. A spring-loaded plunger 12, also fitted with a floating head 14, is provided on the other side of the device and pulls the device body 7 against the three point locations (indicated in FIG. 5c by dashed circles) of the adjustment screws 13. The plunger 12 is angled so as to exert a force maintaining the base location plate 11 against the tip 6 of the blade. Instead of the three adjustment screws 13, the device could have unadjustable fixed pins which would accurately locate the device to just one type of blade. A dedicated device would then be needed for each type of blade.

FIGS. 6a to c are respectively cross-sectional, front and side views of a variant of the device shown in FIGS. 5a to c. In the variant device, instead of the spring-loaded plunger 12, a bladder 15 is inflated via valve assembly 16 in the cavity formed between internal wall 17 of the device and the face of the blade. Internal wall 17 is angled towards front location plate 10 and also towards base location plate 11 (as indicated by the dashed line in FIG. 6b). When the bladder 15 is inflated, this has the effect of pulling the location plates towards the blade. The side of the bladder in contact with the blade can have a high friction surface to prevent the bladder from slipping. Inflation can be achieved using a hand operated pump or syringe.

A device of a type shown in FIGS. 1 to 6 has been successfully used to determine fan tip clearances on a Rolls-Royce Trent 1000 aeroengine. Clearances as small as 0.6 mm have been measured. In use, the calibrated device 4 is mounted onto any selected fan blade with the skid 9 pressing against the wall of the casing, the probe is switched on and a suitable angular datum position relative to a chosen angular position on the casing selected. The fan is rotated manually by the operator, and the device collects and stores fan clearance and fan angular position data during the rotation procedure. Advantageously, the device can be used by the operator stationed at one position and manually rotating the fan, thereby eliminating the need for the climbing of staging or ladders.

Embodiments of the device may include any one or more of the following optional features:
1. An onboard battery, which may or may not be re-chargeable, to power the device and avoid trailing wires.

2. An angular measurement system (indicated on FIG. 4) based, for example, on two accelerometers mounted in quadrature, the output of which can be sent to the microcontroller of the sensor electronics to be appropriately combined with the distance measurements. This then enables the clearance at any fan blade position to be determined relative to a fixed datum on, say, the casing.

3. An onboard memory (indicated on FIG. 4) which can be connected to the microcontroller of the sensor electronics and capable of recording and storing the measured clearance data (and optionally the corresponding angular positions). The memory can also record, for example, the probe operator, calibration data, engine serial number, and/or the date and time. This enables the probe to operate as a stand-alone system, which can be interrogated following use by downloading the stored data into a computer or other system via a docking station.

4. A wireless telemetry system (for example connected to the microcontroller of the sensor electronics as indicated on FIG. 4) capable of transmitting the clearance data (and other data referred to at point 3 above) in real time. This then allows real time recording and graphing of the clearance measured between the fan tip and casing as the fan is rotated by hand.

5. Other measurement systems, such as optical (vision) and triangulation systems.

While the invention has been described in conjunction with the exemplary embodiments described above, many equivalent modifications and variations will be apparent to those skilled in the art when given this disclosure. For example, although the device has been described in relation to the determination of the clearance between a fan blade and the casing an aero engine, it may be used to determine clearances between other rotatable members and the curved surfaces around and relative to which they rotate. For example, the device may be fastened to the inner or outer of a pair of coaxial shafts (which rotate relative to each other) to measure the clearance between the shafts. Indeed, the motion does not need to be relative rotational motion between the member and the surface. Thus the device may be used to determine clearances between any suitable member which moves over and relative to a surface, such as a planar surface. Accordingly, the exemplary embodiments of the invention set forth above are considered to be illustrative and not limiting. Various changes to the described embodiments may be made without departing from the spirit and scope of the invention.

The invention claimed is:

1. A device for determining a clearance between a member and a surface over and relative to which the member moves, the device comprising:
a first reference element;
a second reference element facing the first reference element, and being movable to alter a distance to the first reference element;
a fastening system for fastening the device to the member so that, during relative motion, the first reference element is held in a fixed position relative to the member and the second reference element slides over the surface, wherein
the member is a rotatable member and the surface is a curved surface around and relative to which the rotatable member rotates;
an urging arrangement which urges the second reference element into contact with the surface so that, as the second reference element slides over the surface and the clearance between the member and the surface varies, the second reference element moves relative to the first reference element;
a sensor which measures the distance between the first and second reference elements; and
an angular measurement system positioned on the rotatable member, which measures an angle of rotation of the rotatable member.

2. The device according to claim 1, wherein
the curved surface is the surface of a bore in which the rotatable member rotates.

3. The device according to claim 1, wherein
the curved surface is the inner wall of a casing of a turbomachine, and the rotatable member is a rotor blade of the turbomachine.

4. The device according to any claim 1, wherein
the first and second reference elements comprise respective electrical capacitor plates and the sensor senses changes in the capacitance between the respective electrical capacitor plates to measure the distance between the first and second reference elements.

5. The device according to claim 1, wherein
one of the first and second reference elements comprises an electrical inductor and the sensor senses changes to the coupling between the inductor and the other reference element to measure the distance between the first and second reference elements.

6. The device according to claim 1, further comprising
an onboard battery system which powers the device.

7. The device according to claim 1, further comprising
an onboard memory which stores the distances measured by the sensor.

8. The device according to claim 1, further comprising
a wireless telemetry system which transmits the distances measured by the sensor.

9. The device according to claim 1, wherein the angular measurement system comprises accelerometers to measure the angle of rotation of the member.

10. The device according to claim 9, wherein two accelerometers are mounted in quadrature to measure the angle of rotation of the member.

11. The device according to claim 9, wherein the angular measurements are matched with corresponding distance measurements, allowing the clearance at any angular position to be determined.

12. The device according to claim 1, wherein the first reference element and second reference element are disposed within a space defined by the member and the surface.

13. A method for determining the clearance between a rotor blade and a casing of a turbomachine, the method comprising:
providing the device according to claim 1 to determine the clearance, wherein the distance measured by the sensor is used to determine the clearance between the rotor blade and the casing.

14. A method for determining the clearance between a rotor blade and a casing of a turbomachine, the method comprising:
providing the device according to claim 2 to determine the clearance, wherein the distance measured by the sensor is used to determine the clearance between the rotor blade and the casing.

15. A method for determining the clearance between a rotor blade and a casing of a turbomachine, the method comprising:
providing the device according to claim 3 to determine the clearance, wherein the distance measured by the sensor is used to determine the clearance between the rotor blade and the casing.

16. A method for determining the clearance between a rotor blade and a casing of a turbomachine, the method comprising:
providing the device according to claim 4 to determine the clearance, wherein the distance measured by the sensor is used to determine the clearance between the rotor blade and the casing.

17. A method for determining the clearance between a rotor blade and a casing of a turbomachine, the method comprising:
providing the device according to claim 5 to determine the clearance, wherein the distance measured by the sensor is used to determine the clearance between the rotor blade and the casing.

18. A method for determining the clearance between a rotor blade and a casing of a turbomachine, the method comprising:
providing the device according to claim 6 to determine the clearance, wherein the distance measured by the sensor is used to determine the clearance between the rotor blade and the casing.

19. A method for determining the clearance between a rotor blade and a casing of a turbomachine, the method comprising:
providing the device according to claim 7 to determine the clearance, wherein the distance measured by the sensor is used to determine the clearance between the rotor blade and the casing.

20. A method for determining the clearance between a rotor blade and a casing of a turbomachine, the method comprising:
providing the device according to claim 8 to determine the clearance, wherein the distance measured by the sensor is used to determine the clearance between the rotor blade and the casing.

21. A device for determining a clearance between a member and a surface over and relative to which the member moves, the device comprising:
a first reference element;
a second reference element facing the first reference element, and being movable to alter a distance to the first reference element;
a fastening system for fastening the device to the member so that, during relative motion, the first reference element is held in a fixed position relative to the member and the second reference element slides over the surface, wherein
the member is a rotatable member and the surface is a curved surface around and relative to which the rotatable member rotates;
an urging arrangement which urges the second reference element into contact with the surface so that, as the second reference element slides over the surface and the clearance between the member and the surface varies, the second reference element moves relative to the first reference element;
a sensor which measures the distance between the first and second reference elements; and
an angular measurement system comprising accelerometers to measure the angle of rotation of the rotatable member.

* * * * *